United States Patent
Shylanski (10) Patent No.: US 9,986,232 B1
(45) Date of Patent: May 29, 2018

(54) METHOD FOR DISTANCE CALIBRATION OF MACHINE VISION VEHICLE SERVICE SYSTEM

(71) Applicant: Hunter Engineering Company, St. Louis, MO (US)

(72) Inventor: Mark S. Shylanski, University City, MO (US)

(73) Assignee: Hunter Engineering Company, St. Louis, MO (US)

( * ) Notice: Subject to any disclaimer, the term of this patent is extended or adjusted under 35 U.S.C. 154(b) by 295 days.

(21) Appl. No.: 14/695,819

(22) Filed: Apr. 24, 2015

Related U.S. Application Data (60) Provisional application No. 61/984,357, filed on Apr. 25, 2014.

(51) Int. Cl.
*H04N 17/00* (2006.01)
*G01B 11/27* (2006.01)
(Continued)

(52) U.S. Cl.
CPC ............ *H04N 17/002* (2013.01); *G01B 11/14* (2013.01); *G01B 11/27* (2013.01); *G06K 9/00624* (2013.01); *H04N 7/18* (2013.01)

(58) Field of Classification Search
CPC ........ H04N 17/002; H04N 7/18; G01B 11/14; G01B 11/27; G06K 9/00624
(Continued)

(56) References Cited

U.S. PATENT DOCUMENTS 6,279,246 B1 8/2001 van den Bossche
6,497,134 B1 12/2002 Faul et al.
(Continued)

FOREIGN PATENT DOCUMENTS

WO 9848241 A1 10/1998

OTHER PUBLICATIONS

Oyvind Rotvold, "An Enabling Metrology Concept for Body-In-White Process Control", Metronor, Inc., IBEC 1995, 16 pages, Southfield, Michigan.*
(Continued)

*Primary Examiner* — Jamie Atala
*Assistant Examiner* — Ayman Abaza
(74) *Attorney, Agent, or Firm* — Sanberg Phoenix (57) ABSTRACT

A method for distance calibration of machine vision optical targets and associated observing imaging sensors using separation distances between discrete surface measurement points. First, a spatial position for each surface point is established from a series of observations by the associated observing imaging sensor of the optical targets mounted to a calibration fixture. Second, measures of a linear separation distance between particular pairs of surface points are identified independently from the machine vision observations. All resulting spatial positions and measurements are conveyed to a processing system configured with a set of software instructions for carrying out distance calibration calculations to establish a set of refined distance calibration parameters associated with each combination of optical target and observing imaging sensor. During subsequent use of the machine vision vehicle service system, the parameters are retrieved and utilized to improve vehicle measurement precision.

13 Claims, 4 Drawing Sheets

(51) Int. Cl.
*G01B 11/14* (2006.01)
*G06K 9/00* (2006.01)
*H04N 7/18* (2006.01)

(58) Field of Classification Search
USPC .......................................................... 348/92
See application file for complete search history.

(56) References Cited

U.S. PATENT DOCUMENTS

| | | | |
|---|---|---|---|
| 6,658,751 B2 | 12/2003 | Jackson et al. | |
| 6,796,043 B2 | 9/2004 | Jackson et al. | |
| 2003/0103651 A1* | 6/2003 | Novak | G01C 11/02 382/106 |
| 2006/0279728 A1* | 12/2006 | Dorrance | G01B 11/2755 356/139.03 |
| 2014/0111645 A1 | 4/2014 | Shylanski et al. | |
| 2014/0223989 A1 | 8/2014 | Stieff | |

OTHER PUBLICATIONS

Chief Automotive Systems Product Literature, "The Genesis System From Chief", Form No. GMS, Jun. 1998, 6 pages, Chief Automotive Systems, Inc., Grand Island, Nebraska.

Chief Automotive Systems Product Literature, "Genesis Electronic Measuring System", Form No. GEMS, May 1993, 8 pages, Chief Automotive Systems, Inc., Grand Island, Nebraska.

Jurgen Dold, "Practice Report—The Role of a Digital Intelligent Camera in Automating Industrial Photogrammetry", Leica Geosystems AG Product Literature, Publication No. U1-356-0EN, 1998, 8 pages, Leica Geosystems AG, Unterentfelden, Switzerland.

Gabor Fichtinger, "Essential Math for CIS Part 2: Transformations and Frames of Reference", NSF-Funded Engineering Research Center for Computer-Integrated Surgical Systems and Technology, Johns Hopkins University, 2001, 35 pages.

Giuseppe Ganci et al., "BMW applies V-STARS", Leica Geosystems AG Product Literature, Publication No. 723559en, Nov. 2000, 8 pages, Leica Geosystems AG, Unterentfelden, Switzerland.

Giuseppe Ganci et al., "The Use of Self-Identifying Targeting for Feature Based Measurement", Coordinate Measuring System Committee, Jul. 2000, 9 pages, Dearborn, Michigan.

David Robert Gauldie, "Calibration and Registration With 3D A-Mode Ultrasound", Queen's University, Dec. 2002, 90 pages, Kingston, Ontario, Canada.

* cited by examiner

METHOD FOR DISTANCE CALIBRATION OF MACHINE VISION VEHICLE SERVICE SYSTEM

CROSS-REFERENCE TO RELATED APPLICATIONS

The present application is related to, and claims priority from, U.S. Provisional Patent Application Ser. No. 61/984,357 filed on Apr. 25, 2014, and which is herein incorporated by reference.

STATEMENT REGARDING FEDERALLY SPONSORED RESEARCH

Not Applicable.

BACKGROUND OF THE INVENTION

The present application is related generally to methods for calibrating a machine vision vehicle measurement system, and in particular, to methods for establishing distance scale factors or calibration parameters associated with individual optical targets of a machine vision vehicle measurement system to improve the accuracy of acquired vehicle measurements, such as vehicle symmetry measurements.

Vehicle symmetry measurements are based on the relative positions of a vehicle's four wheels, and include quantities such as wheelbase, setback, lateral offset, etc. Traditionally, vehicle symmetry measurements determined by a machine vision vehicle measurement or wheel alignment system are computed based on an assumption that a set of wheel-mounted optical targets which are observed by the imaging sensors of the machine vision system have been constructed to precise design dimensions, and have not undergone significant changes in size and shape over time. However, it has been observed that even small variations in the size and shape of features on the machine vision targets can introduce biases in the symmetry measurements. For example, if a left rear optical target and a right rear optical target in a machine vision system differ in size by one tenth of a percent or more, inter-camera transforms determined through a conventional optimization and calibration procedure may suffer significant distortion.

Current target characterization procedures used with commercially available machine vision vehicle wheel alignment systems, such as those sold by Hunter Engineering Co. of St. Louis, Mo. produce a model of the machine vision optical targets represented as scaled variations from the particular optical target's ideal design. Such machine vision vehicle service system imaging sensors or cameras introduce a bias when measuring a distance to a machine vision optical target disposed within a field of view if the calibrated focal length stored with the imaging sensor or camera calibration parameters deviates from the effective focal length. Such imaging sensor or camera-based bias is considered a minor defect in the process of calibrating a machine vision imaging sensor or camera, and is expected. It is a system design decision whether to seek to provide some after-the-fact correction of any measurement bias that results from such imperfection.

A precision distance calibration procedure for use with a machine vision vehicle inspection or wheel alignment system would be advantageous in order to accurately account for deviations in the system between ideal configurations and actual configurations of components. Accounting for deviations such as actual spacing between optical target elements or imaging sensor focal lengths could provide improved distance measurements and enable an overall improvement in measurement accuracy for the machine vision vehicle service or inspection system.

BRIEF SUMMARY OF THE INVENTION

Briefly stated, the present disclosure sets forth a method for precision distance calibration of a machine vision vehicle inspection or wheel alignment system employing cameras or imaging sensors to observe a set of optical targets each including a plurality of optical target elements. The precision distance calibration procedure acquires measurements of linear distances between discrete surface measurement points disposed on an alignment surface within the field of view of the machine vision system camera or imaging sensor in two ways. First, each surface point is measured from a series of machine vision observations as a calibration fixture with a mounted machine vision optical target is rotated to various positions while one of the supporting feet of the fixture is maintained in alignment with the surface point being measured. Second, a measurement tape or rule is employed to directly measure the linear distance between adjacent surface points. All of the resulting measurements are recorded and conveyed to a processing system configured with a set of software instructions for carrying out the precision distance calibration calculations. Once the precision distance calibration procedure and calculations are performed for a machine vision vehicle service system, a set of distance calibration parameters associated with the set of optical targets and observing cameras or imaging sensors are computed and stored in an accessible memory. During subsequent use of the machine vision vehicle service system, the stored distance calibration parameters are retrieved and utilized during various distance-finding measurement procedures to produce improved vehicle measurements.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1:
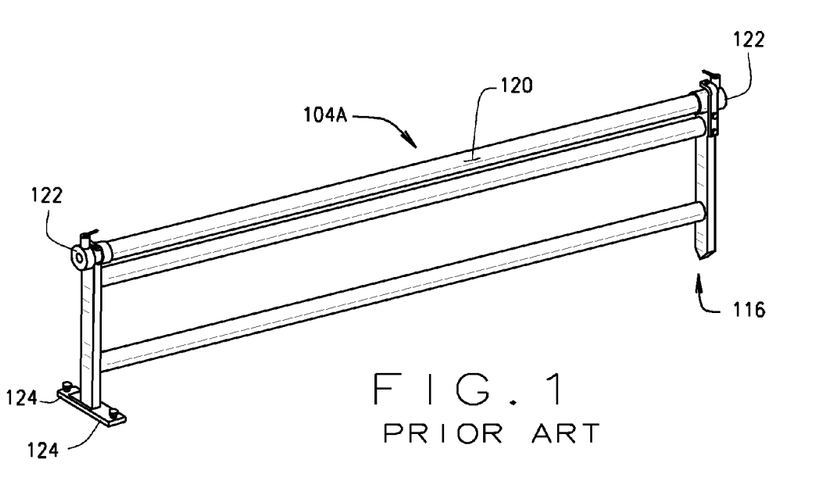
FIG. 1 is a perspective view of a prior art machine vision vehicle wheel alignment or inspection system calibration fixture.
Figure 2:
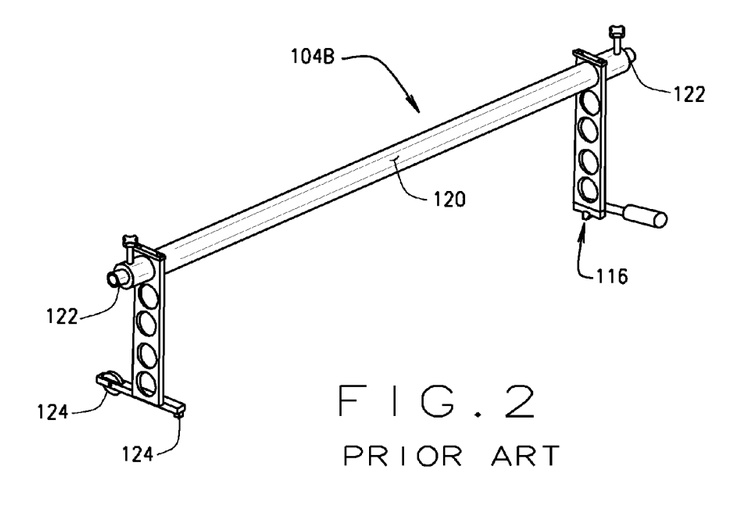
FIG. 2 is a perspective view of a prior art light-weight machine vision vehicle wheel alignment or inspection system calibration fixture.
Figure 3:
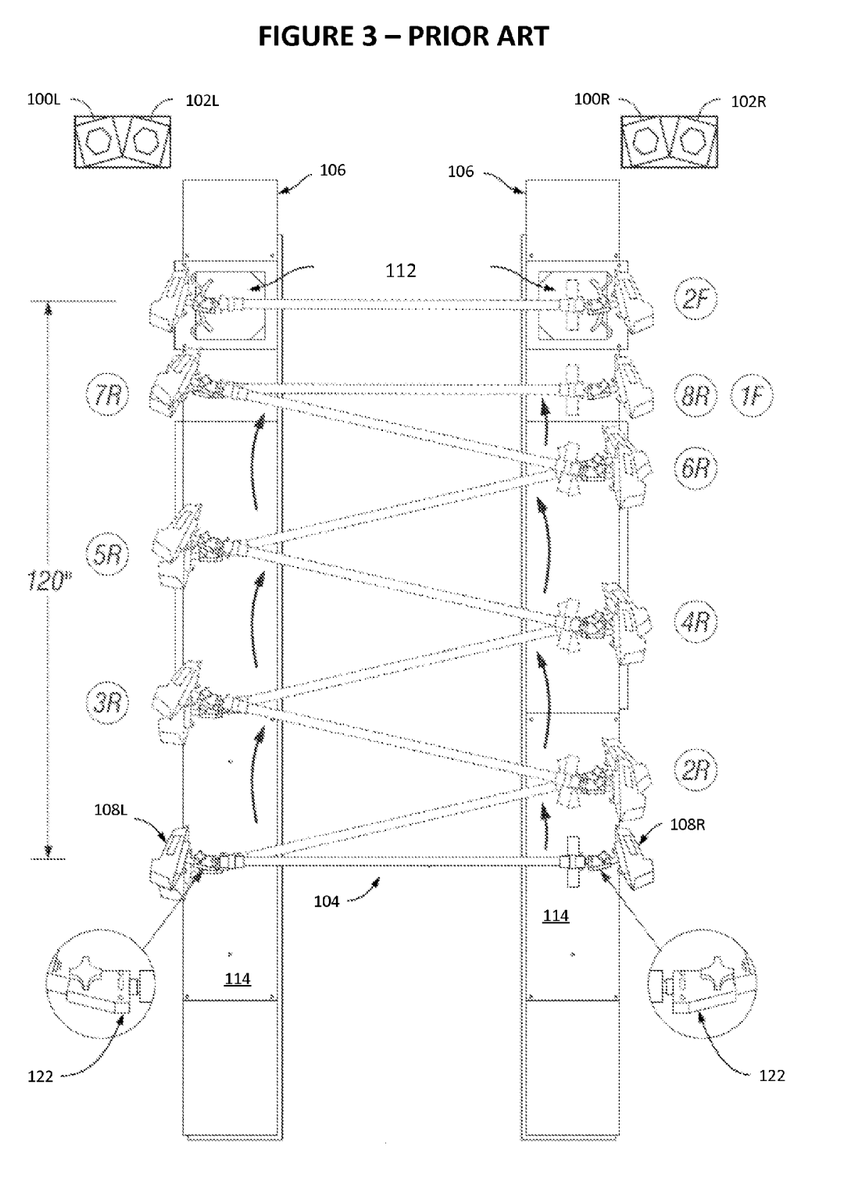
FIG. 3 is a representation of calibration fixture movements during a prior art calibration procedure for a machine vision vehicle wheel alignment or inspection system.

During the initial set-up or service of a machine vision vehicle wheel alignment or inspection system having four cameras 100R, 100L, 102R, and 102L, a field calibration procedure utilizing calibration fixtures 104A, 104B such as shown in FIGS. 1 and 2 is carried out in order to establish the physical relationship between the multiple cameras or imaging sensors and the alignment surfaces 106 within the associated fields of view upon which a vehicle (and optical targets) is disposed during an alignment or inspection procedure. An exemplary method of field calibration illustrated in FIG. 3 is known in the industry and is set forth and described in co-pending U.S. Patent Application Publication No. 2014/0111645 A1, which is herein incorporated by reference. This field calibration procedure begins with the calibration fixture 104, with mounted optical targets 108L and 108R, placed straight across an empty pair of runways, treadways, or alignment surfaces 106 in the rear axle area, as shown at 1R in FIG. 3. The rear axle area generally refers to the portion of the runways, treadways, or alignment surfaces 106 in which the rear axle of a vehicle would be present during a vehicle wheel alignment measurement. As seen in FIG. 3, the field calibration procedure requires repeatedly taking a series of observations and then moving the calibration fixture 104 to a new position along the runways, treadways, or alignment surfaces 106 through a sequence of alternating pivoting movements of each lateral end, as denoted by the arrows and locations 2R, 3R, 4R, 5R, 6R, 7R, 8R, 1F, and 2F shown in FIG. 3. In one embodiment of the present disclosure, precision distance calibration procedures of the present disclosure are implemented as an additional sequence of steps during the final stages of the aforementioned field calibration procedure.

Figure 4:
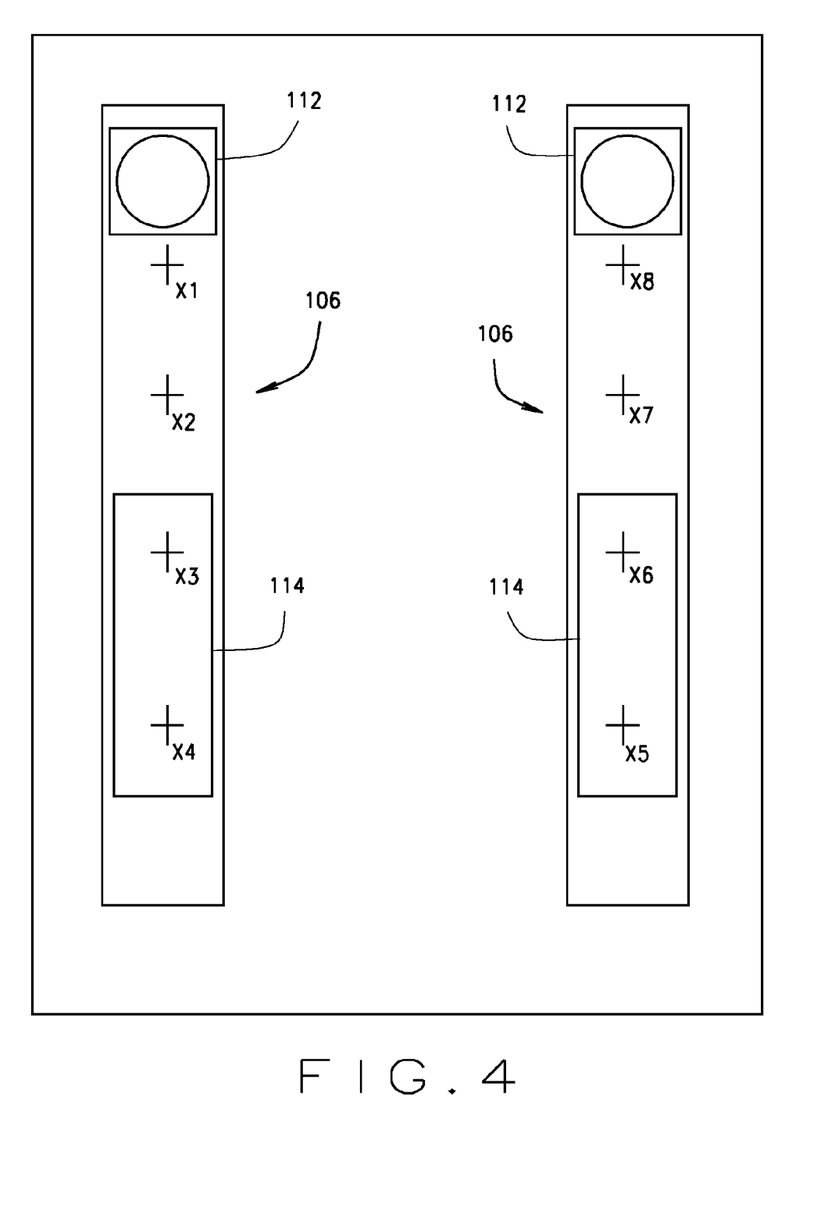
FIG. 4 is a representation of a set of surface measurement points utilized by the distance calibration procedures of the present disclosure on the treadways of a vehicle service bay floor or vehicle alignment rack structure.

Initially in the precision distance calibration procedure of the present disclosure, a set of surface measurement points, such as $X_1$-$X_4$, are established on a first treadway of the alignment surface 100 as shown in FIG. 4, which may be a floor surface or a vehicle lift surface, and a second set of surface measurement points, such as $X_5$-$X_8$, are established on a second treadway of the alignment surface. The precision distance calibration procedure measures distances between adjacent established surface measurement points on a common treadway in two ways. First, an operator is guided through a procedure where a spatial position associated with each surface measurement point X is measured through a series of observations of a calibration bar 104 with a mounted machine vision optical target 108. With one of the supporting feet of the fixture maintained in alignment with the surface measurement point being measured, the machine vision optical target is observed by the imaging sensors 100, 102 of the machine vision system with the optical target 108 pivoted to a number of different orientations about multiple axes. Second, the operator utilizes a measurement tape or delineated rule to record a direct measurement of the linear distance between particular pairs of surface measurement points $X_n$, $X_{n+1}$ on a common treadway and provides those readings as input to a processor of the machine vision system. An evaluation of linear separation distances obtained from both the machine vision measurements and the direct measurements is completed by a calibration software program running on the processor to establish a set of distance calibration parameters associated with the optical targets and observing imaging sensors.

In greater detail, to carry out the distance calibration procedure which an initial designation is required for the locations of surface measurement points ($X_1$-$X_n$) in a set that lie upon the treadways of the alignment surface. At least two adjacent surface measurement points on a common treadway are preferably used in the computation of the each distance calibration parameter, hence, to correct for the size of each machine vision optical target 108 in a four-wheel alignment system (or an optical deviation in each of four machine vision imaging sensors or cameras 100, 102), a minimum of eight discrete surface measurement points (four on each treadway) are required to compute a full set of calibration parameters. Specifically, each individual machine vision optical target (left-front, right-front, left-rear, and right rear) is observed at two different surface measurement points by an associated machine vision imaging sensor or camera (left-front 100L, right-front 100R, left-rear 102L, right-rear 102R). If the discrete surface measurement points lie within an overlapping field of view for front and rear machine vision imaging sensors or cameras, it is possible to use the same surface measurement points for both front and rear machine vision optical targets, reducing the total number of unique surface points required to four. It will be further recognized that depending upon the number of distance scale factors to be computed, such as one per each optical target, the total number of surface measurement points may vary from the examples set forth herein, so long as data for each combination can be acquired at two different surface measurement points to permit the computation of a linear separation distance both from the acquired images and from a direct linear measurement.

Considering the path of each front wheel as a vehicle is brought onto the alignment surface 106, such as a treadway on an automotive lift rack or floor surface, the exemplary distance calibration procedure utilizes at least four surface measurement points X identified along each treadway surface. Two surface measurement points for use with a front machine vision optical target, and two surface measurement points for use with a rear machine vision optical target. Each surface measurement point X may be established or identified by any suitable means, such as by drawing a series of "+" marks with a felt-tip marker on the treadway surface, or positioning a rail with pre-drilled conical holes in a fixed position on each treadway of the alignment surface 106. Once identified, the surface measurement points X must not move in relation to the machine vision cameras or imaging sensors 100, 102 during the distance calibration procedure. If some of the surface measurement points are located on a movable surface, such as on a turn plate 112 or slip-plate 114, those movable surfaces are required to be securely locked against movement during the distance calibration procedure. Similarly, if some or all of the surface measurement points are located on a portion of an automotive lift-rack, the rack is required to remain locked at a constant height during the distance calibration procedure. If the machine vision cameras or imaging sensors 100, 102 are mounted to a moveable boom or moveable alignment console, that boom or console cannot not be moved during the distance calibration procedure.

As noted for calibration of a four-target system, each treadway of the alignment surface 106 should have at least four surface measurement points X (two per each target on the associated side) that lie approximately in a line along a flat surface that stretches generally from the front axle area of the alignment surface to the rear axle area of the alignment surface. There is a degree of flexibility in the exact placement of the surface measurement points X, so a specific or uniform inter-point spacing is not required. A nominal layout for a typical alignment bay or vehicle service area begins behind the front turn plates 112 on each treadway and places each successive surface measurement point approximately 35 inches rearward beyond the location of the previous point. On each treadway, the forwardmost surface measurement point is positioned such that an observing front camera or imaging sensor 100L, 100R can acquire images of a machine vision front optical target 108 mounted to a calibration fixture 104, when the calibration fixture is placed such that a supporting pivot foot 116 is centered on the front surface measurement point X. Similarly, the rearmost surface measurement point is positioned such that an observing rear camera or imaging sensor 102L, 102R can acquire images of a machine vision optical target 108 mounted to the calibration fixture 104, when the calibration fixture is placed such that the supporting pivot foot 116 is centered upon the rear surface measurement point X.

Each of the two middle surface measurement points along a given treadway are positioned such that the front and rear machine vision imaging sensors on an observing side of the alignment surface each have clear visibility to an associated machine vision optical target mounted to the calibration fixture when the calibration fixture is placed such that a supporting pivot foot is centered upon at least one of the middle surface measurement points X.

During the measurement phase of the distance calibration procedure, the operator repeatedly executes a "Cal Bar Pivoting Procedure" to obtain the spatial position of each of the individual surface measurement points X from images acquired by the machine vision imaging sensors. The Cal Bar Pivoting Procedure, illustrated in FIG. 5, involves the collection of multiple images of one machine vision optical target 108L when there is a known physical relationship between the machine vision optical target and the surface measurement point X. To establish this known relationship, each image or snapshot in the collection is acquired when the optical target 108L is mounted to the calibration fixture 104 at the end closest to the pivot foot 116, while the pivot foot 116 is positioned on the surface measurement point X undergoing measurement. The physical relationship between the optical target 108L and the pivot foot 116 of the calibration fixture 104 remains constant as the calibration fixture is moved through a sequence of different attitudes about at least two different rotational axes relative to the observing machine imaging sensor 100 or 102, and associated images of the optical target 108L are acquired. The operator maintains the pivot foot 116 in alignment with the surface measurement point X as the calibration fixture is advanced through the series of attitudes, such that the calibration fixture 104 can be seen in the associated images to "pivot" relative to the surface measurement point X.

Exemplary calibration fixtures 104A, 104B suitable for use with the present procedure are illustrated in FIGS. 1 and 2, and each include a longitudinal bar 120 having a socket or adapter 122 for receiving a machine vision optical target on each end, such as shown in co-pending U.S. Patent Application Publication 2014/0223989 A1, which is herein incorporated by reference. One end of the calibration fixture 104 is supported by a single pivot foot 116 on a first treadway, and the other end is supported on the second treadway by dual supports or feet 124, one of which may actually be a wheel such as seen in FIG. 2.

Those of ordinary skill will recognize that not all machine vision aligner calibration fixtures are compatible with the Cal Bar Pivoting Procedure, depending upon the shape of the pivot foot 116 and the dual support or "feet" 124. The single pivot foot 116 is preferably conical in shape, and contacts the alignment surface with a generally circular contact region or tip having a diameter of less than about three millimeters. Some calibration fixtures may have a prospective pivot foot or foot 116 which is not conical, having a contact region footprint that is a centimeter or two in length, and are incompatible with the present procedures, as they fail to provide a required measure of precision while maintaining the placement of the pivot foot 116 on the surface measurement point X of the treadway 106. Those of ordinary skill in the art will further recognize that the calibration fixtures utilized need not include the longitudinal bar 120, and may in fact be configured to position only a single optical target 108 on a single treadway, provided that the calibration fixture remains capable of being manipulated about at least two axis while maintaining precise positioning relative to the pivot foot 116.

Figure 5:
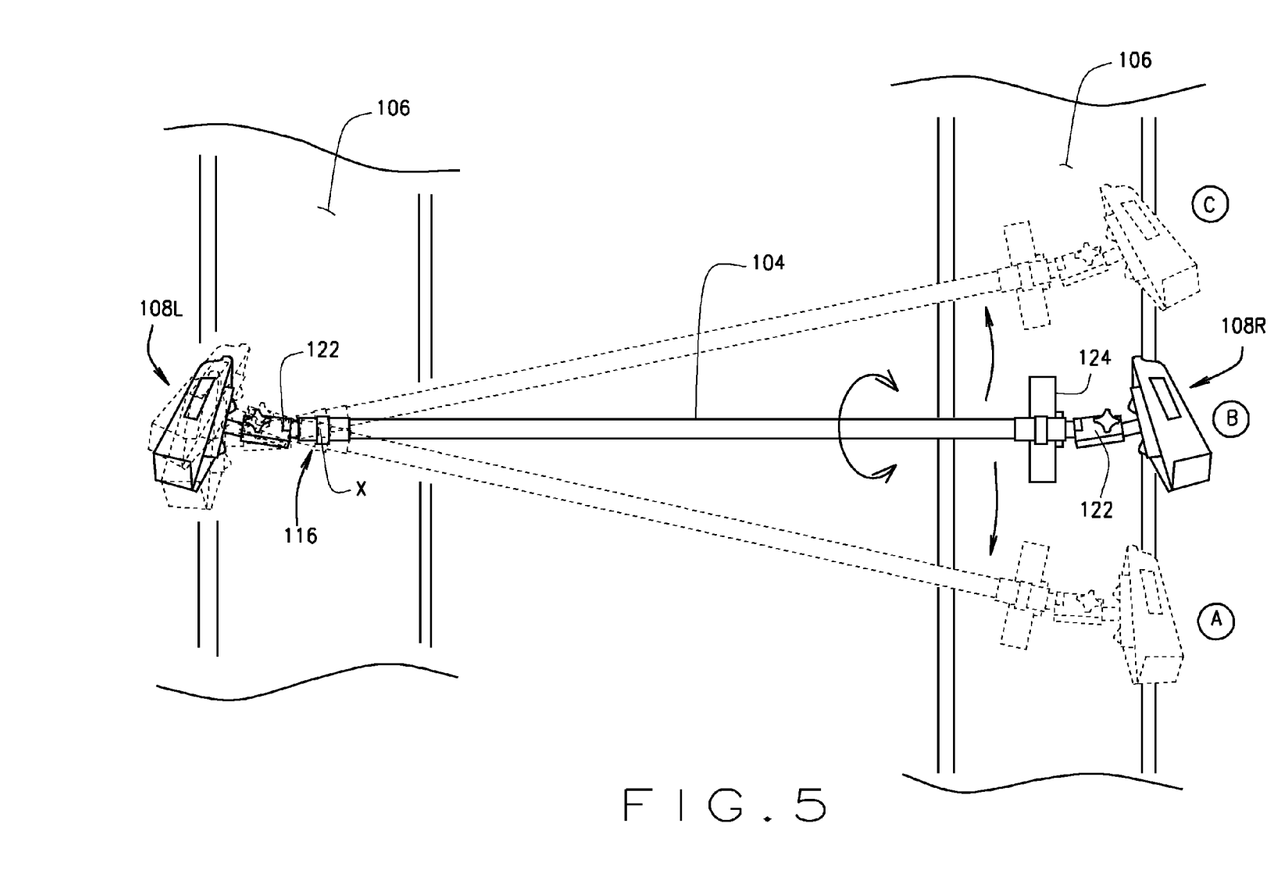
FIG. 5 is an illustration of the calibration fixture movements during the Cal Bar Pivoting distance calibration sub-procedure of the present disclosure.

As seen in FIG. 5, the Cal Bar Pivoting Procedure begins with the calibration fixture 104 placed approximately straight across (transverse to) the parallel treadways of the alignment surface 106 with the pivot foot 116 resting within a few centimeters of the surface measurement point X. The machine vision vehicle service system software is configured to instruct the operator to mount a particular machine vision optical target 108L to the calibration fixture socket 122 closest to the pivot foot 116. The optical target 108L is preferably mounted to "toe-in" approximately 15 degrees relative to the longitudinal axis of the calibration bar 104, thereby keeping important target features visible to the imaging sensors 100, 102 during upcoming snapshots when the calibration fixture 104 may be place at a diagonal position across the alignment surface 106. If necessary, an adapter 122 may be utilized to secure the machine vision optical target 108L to the calibration fixture socket 122 at the appropriate angle. The calibration fixture socket must remain locked against any rotational movement of the optical target relative to the fixture during the entire series of snapshots used to measure a particular surface measurement point.

Once the optical target 108L is secured to the calibration fixture, the machine vision service system acquires an initial image of the optical target with the calibration fixture disposed at the initial straight across or transverse position between the two treadways of the alignment surface 106. The initial image of the optical target 108L is processed in the processing system by the calibration software to establish spatial position data associated with the current surface measurement point X. The spatial position data acquired from the initial image guides subsequent image acquisition. Since the position of the optical target 108L during the initial observation is not used in the final mathematical estimation of the spatial coordinates of the surface measurement point X, the pivot foot 116 is not required to be exactly aligned with the surface measurement point X for this initial step in the procedure.

To prepare for acquisition of the first measurement snapshot or image of the optical target 108L with the pivot foot 116 positioned on the surface measurement point X, the calibration software procedure directs the operator, via instructions presented on a display, to slide an end of the calibration bar or fixture 104 that is opposite to the pivot foot 116, in a rearward direction until the calibration bar or fixture 105 is at an angle of about 15 degrees relative to a straight-across position transverse to the treadways of the alignment surface 106. This orientation is designated as position "A" in FIG. 5. The operator must take care to make small adjustments, if necessary, to ensure that the footprint of the calibration fixture's pivot foot 116 remains aligned with the surface measurement point X being measured. For example, if the surface measurement point X is identified by an "+" mark applied to the treadway of the alignment surface 106 with a felt-tip marker, then the operator should confirm that the tip of the pivot foot 116 is centered relative to both of the lines forming the "+" mark. Alternatively, placement detents or receiving slots may be machined directly into either the treadway of the alignment surface 106 or into a strip of suitable material temporarily secured in place on the treadway. Once the calibration fixture 104 is positioned, an image or snapshot of the optical target 108L adjacent the surface measurement point X is acquired by the machine vision service system.

To prepare for the second snapshot, the calibration software will next direct the operator to slide forward the calibration fixture end opposite the pivot foot 116 so that the calibration fixture 104 is returned to a position which is approximately straight across the alignment surface 106, i.e., transverse or perpendicular to the treadways, as shown at position "B" in FIG. 5. At this position, the operator is directed to rotate the calibration fixture about a generally longitudinal axis. Rotation may be achieved by utilizing a shim to elevate one of the two feet 124 on the calibration fixture end opposite the pivot foot 116. The shim should be a piece of rigid material that raises one of the fixture feet 124 by approximately 16 millimeters, effectively rotating the optical target 108L about a longitudinal axis within the field of view of the machine vision cameras/imaging sensors. Once positioned, a second snapshot or image of the optical target 108L is acquired by the machine vision cameras/imaging sensors.

To prepare for the third snapshot, the calibration software directs the operator to rotate the calibration fixture about a generally longitudinal axis in the opposite direction. This rotation may be achieved by repositioning the shim to raise the second foot 124 on the calibration fixture end opposite the pivot foot 116 by approximately 16.0 millimeters, and to reposition the first foot 124 back onto the supporting surface 106. Once positioned, a third snapshot or image of the optical target 108L is acquired by the machine vision cameras/imaging sensors 100, 102.

After the third snapshot is acquired, the calibration software directs the operator to return the calibration fixture 104 to the original rotational orientation, such as by removal of the shim from under the calibration fixture foot 124, and to slide the calibration fixture end opposite the pivot foot 116 forward to until it lies about at an angle of about 15 degrees relative to a straight-across position transverse to the treadways of the alignment surface 106, as shown at position "C" in FIG. 5. After verification of the pivot foot 116 location on the surface measurement point X, the fourth and final snapshot of the optical target 108L is acquired by the machine vision cameras/imaging sensors 100, 102 for the Cal Bar Pivot Procedure, and the image data is transferred to the processing system.

It will be appreciated that the effect of the movements of the calibration fixture 104 between each image acquisition is to achieve a rotation of the optical target 108L about at least two different axes associated with the currently selected surface measurement point X. The axes may be orthogonal to each other, but any set of distinct axes may be utilized. Movement between positions A and C effectively rotate the optical target about a first axis (which can be visualized as extending vertically upward through the selected surface measurement point X, perpendicular to the plane of the alignment surface), while the rotational movements at position B, such as generated by placement of the shims, effectively rotate the optical target 108L about a second, generally longitudinal axis (which can be visualized in a plane parallel to the alignment surface 106 on which the surface measurement point X is located.

The procedure is repeated with the calibration fixture 104 at each of the surface measurement points $X_1$-$X_n$, with an optical target 108 suitable for use at the specific measurement point. For example, at measurement points which are adjacent the rear left side of the alignment surface, a left optical target 108L is used, and at measurement points which are adjacent the front right side of the alignment surface, a right optical target 108R is used. If the set of optical targets includes different targets for front and rear positions as well as left and right sides, the appropriate exchanges should be made for the optical target mounted adjacent to the pivot foot 116 when the calibration fixture is moved to each surface measurement point $X_1$-$X_n$.

A second part of the distance calibration procedure identifies the distances between numerous pairs of surface measurement points X on each treadway of the alignment surface 106 or to an associated reference point, independent of the acquired image data, either by recalling measurements (such as manufacturing specifications) from a data store, or by acquiring precise manual measurements of the surface measurement point spacing. Manual measurements can be accomplished using a tape measure, rule, surface marking tape, or other accurate manual measurement device. If a tape measure or linear distance measurement device is used, it must be laid out in a straight line during the measurement. If there are obstructions between two surface measurement points $X_n$, $X_{n+1}$, or the reference point, the equivalent linear distance can be measured by taking a reading of the tape measure between points that are above the surface measurement points and spaced by precisely the same distance. All manual distance measurements must represent a straight line distance within a plane parallel to the treadway surface in which the measurement points are located.

Once completed, the data from the images acquired during the Cal Bar Pivoting procedures is processed by suitable software instructions in a processing system to identify spatial positions for individual surface measurement points, and to then obtain estimates of the linear separation distances between pairs of identified spatial positions or between the identified spatial positions and the associated reference point. These estimates are compared against the independently identified distances values obtained from the data store, or from using the tape measure, rule, or other measurement device. The comparison establishes a set of calibration parameters or, distance scale factors associated with the individual machine vision optical targets 108L, 108R alone and in combination with the particular observing imaging sensor or camera 100, 102. These include the left front camera 100L with a left front machine vision optical target; the right front camera 100R with a right front machine vision optical target; the left rear camera 102L with a left rear machine vision optical target; and the right rear camera 102R with a right rear machine vision optical target for a four-sensor/four-target system. Additional calibration parameters may be calculated as well, such as for other combinations of the observing imaging sensors or cameras and the machine vision optical targets.

The set of target calibration parameters, in the form of distance scale ratios associated with individual machine vision optical targets 108 and with observing imaging sensors or cameras 100, 102, are available for use to refine the calibration observations of any previously completed calibration procedure that were acquired before the completion of the distance calibration steps, permitting final system calibration optimizations to directly benefit from these improved or refined calibration observations. Alternatively, the distance scale ratios, may be utilized together in a combined optimization process with other calibration observations of the machine vision vehicle service system to produce a complete set of calibration parameters or optimizations for the machine vision service system.

The optical target calibration parameter information is available for use to adjust characterization data for the machine vision optical targets 108 used in the calibration procedure. Adjusting characterization data to compensate for distance scale ratios leads to improved accuracy during subsequent alignment or inspection measurements of a vehicle, when using the distance calibrated machine vision optical targets 108.

Distance scale ratios for individual machine vision optical targets 108 are indexed with optical target identifying tags, and are retained in an accessible data store, such as on the hard disk of the machine vision vehicle service system, or in a network accessible remote storage, as are the refined target characterization data files. Therefore, the results of the optical target calibration can remain in use with those machine vision optical targets 108 for months or years, assuming the machine vision optical targets 108 remain unchanged or undamaged. A fresh run of the optical target calibration procedures may be desirable if the machine vision optical targets 108 are exposed to conditions that could be expected to induce any change in target size or shape. Such conditions include severe impact to the target or replacement of the retro-reflective decals on the machine vision optical target. Additionally, a given machine vision optical target 108 can undergo a re-characterization procedure without losing the benefit of earlier calibration measurements. The optical target calibration parameter information is retained in the accessible data store, and the output of a new characterization of the same machine vision optical target 108 can be adjusted to compensate for the distance scale ratios recorded earlier.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for establishing a distance calibration parameter for an optical target in a set of optical targets of a machine vision vehicle service system, comprising:
disposing said optical target from said set of optical targets at a position having a known relationship to a stationary measurement point on a vehicle support surface;
acquiring, by use of a camera or imaging sensor of said machine vision vehicle service system, a set of images of said optical target disposed at a plurality of orientations about at least two rotational axes while maintaining said known relationship between said optical target and said stationary measurement point;
processing in said machine vision vehicle service system, each image in said set of acquired images together with said known relationship between said optical target and said stationary measurement point as input to a regression analysis of an overdetermined system in order to establish a first distance measurement between said stationary measurement point and a fixed reference location having a known spatial relationship with said at least one camera or imaging sensor;
obtaining a second distance measurement between said stationary measurement point and said reference location, said second distance measurement obtained independent of said set of acquired images;
conveying said second measurement to said machine vision vehicle service system;
establishing in said machine vision vehicle service system, a distance calibration parameter associated with said optical target from said first and second distance measurements; and
refining, with said machine vision vehicle service system, distance measurements established from images of said optical target acquired with said at least one camera or imaging sensor by application of said distance calibration parameter.

2. The method of claim 1 wherein said set of images of said optical target at said plurality of orientations includes images of said optical target at a first pair of orientations about a first axis associated with said stationary measurement point, and images of said optical target at a second pair of orientations about a second axis associated with said stationary measurement point.

3. The method of claim 1 further including the step of storing said established distance calibration parameter for said optical target in an accessible data store.

4. The method of claim 1 further including the step of applying said established distance calibration parameter to a set of calibration observations of said optical target associated with a relationship between said at least one acquiring camera or imaging sensor and a surface supporting a vehicle during a service or inspection procedure to establish a set of surface calibration parameters.

5. The method of claim 1 further including the step of establishing a focal length calibration parameter for said acquiring camera or imaging sensor from said first and second distance measurements.

6. The method of claim 1 wherein said fixed reference location is a second surface measurement point on said vehicle support surface.

7. The method of claim 1 wherein said established distance calibration parameter is further associated with said at least one acquiring camera or imaging sensor.

8. A method for calibration of a machine vision vehicle measurement or inspection system having a set of imaging sensors for observing a set of optical targets disposed within a field of view, comprising:

identifying a set of surface measurement points on each treadway of a vehicle support surface, each of said identified surface measurement points within a field of view of at least one imaging sensor from said set of imaging sensors;

for each surface measurement point within said set of surface measurement points, disposing an optical target from said set of optical targets at an associated position, whereby each optical target in said set is disposed in a known relationship with at least one point in said set of surface measurement points;

for each disposed optical target, acquiring with at least one imaging sensor from said set of imaging sensors, a set of images of said disposed optical target at a plurality of orientations about at least two rotational axes relative to the associated surface measurement point while maintaining said known relationship between said disposed optical target and said surface measurement point;

for each disposed optical target, processing with said machine vision vehicle measurement or inspection system, said acquired set of associated images together with said known relationship between said optical target and said associated surface measurement point in a regression analysis of an overdetermined system to establish a set of spatial position measurements representing each of said surface measurement points;

measuring, for each surface measurement point on an associated treadway, a linear spacing distance from the surface measurement point to an associated reference point, said measured linear spacing distances establishing a set of distance measurements;

conveying said set of distance measurements to said machine vision vehicle measurement or inspection system;

collectively evaluating with said machine vision vehicle measurement or inspection system, said set of spatial position measurements and said set of distance measurements to establish at least one distance calibration parameter associated with each optical target in said set of optical targets; and refining, with said machine vision vehicle measurement or inspection system, distance measurements established from images of said optical targets acquired with said set of imaging sensors by application of said distance calibration parameters associated with said optical targets to each of said established distance measurements.

9. The method of claim 8 wherein each of said established distance calibration parameters are further associated with an imaging sensor observing said associated optical target.

10. The method of claim 8 further including the step of utilizing each of said at established optical target calibration parameters to refine one or more machine vision vehicle service system alignment surface calibration observations.

11. The method of claim 10 wherein each surface measurement point is stationary, and for each disposed optical target, said set of images includes at least a first image of said disposed optical target acquired with said disposed optical target at a first rotational position about a first axis associated with said at least one surface measurement point;

a second image of said disposed optical target acquired with said disposed optical target rotationally displaced to a second position about said first axis;

a third image of said disposed optical target acquired with said disposed optical target displaced to a first position by rotation about a second axis associated with said at least one surface measurement point; and a fourth image of said disposed optical target acquired with said disposed optical target displaced by rotation to a second position about said second axis associated with said at least one surface measurement point.

12. The method of claim 8 wherein disposing said optical target includes mounting said optical target to a calibration fixture; and positioning said calibration fixture relative to said surface measurement point.

13. The method of claim 8 wherein each associated reference point is a surface measurement point on said treadway.

* * * * *